UNITED STATES PATENT OFFICE.

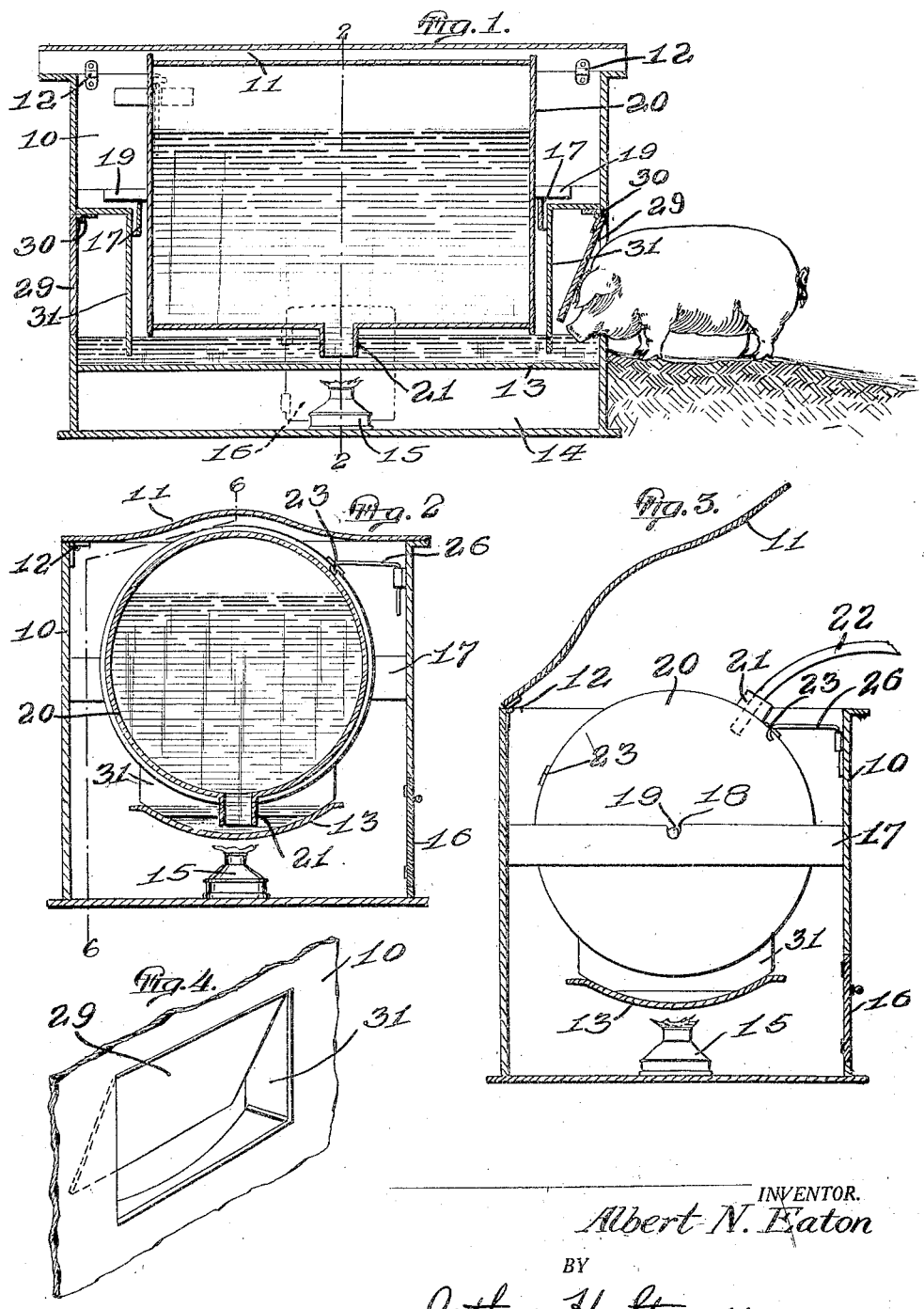

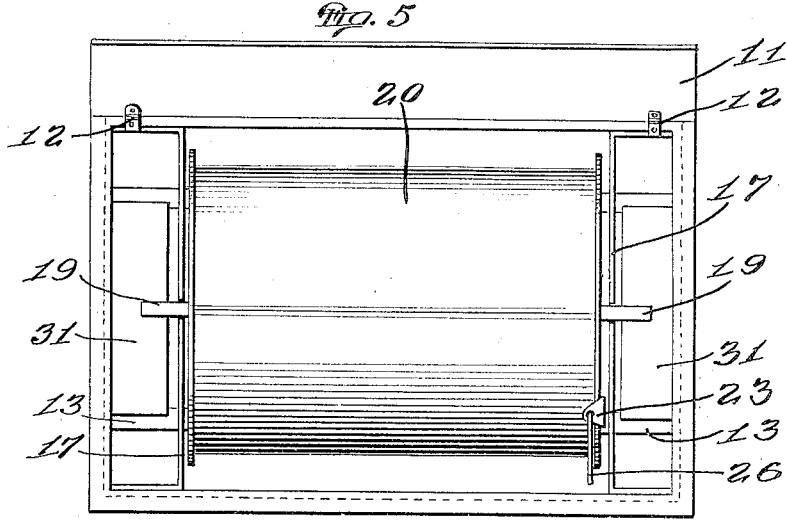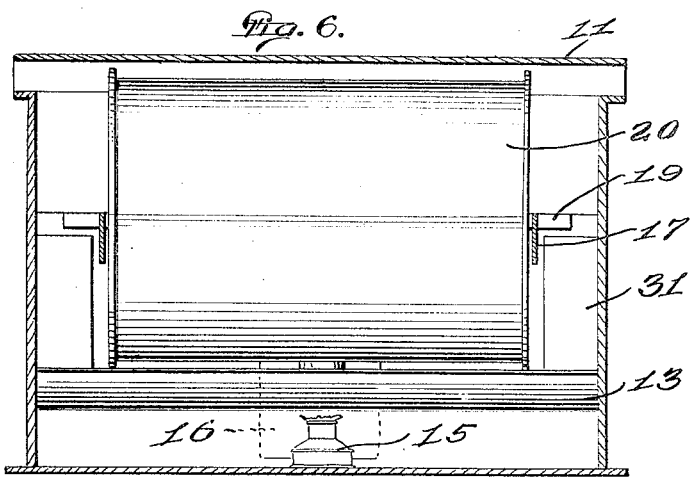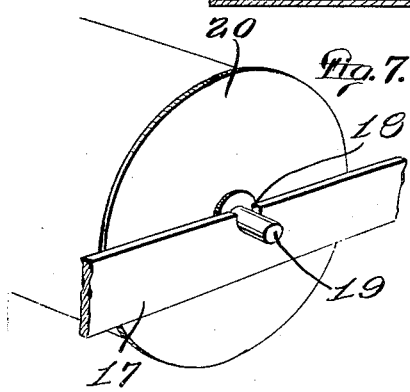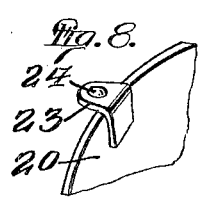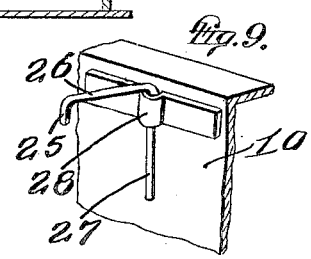

ALBERT N. EATON, OF OMAHA, NEBRASKA.

STOCK-WATERING TANK.

1,375,039.  Specification of Letters Patent.  Patented Apr. 19, 1921.

Application filed March 15, 1920. Serial No. 365,896.

*To all whom it may concern:*

Be it known that I, ALBERT N. EATON, a citizen of the United States, residing at Omaha, in the county of Douglas and State of Nebraska, have invented certain new and useful Improvements in Stock-Watering Tanks, of which the following is a specification.

The present invention relates to improvements in stock-watering tanks, and more particularly relates to an improved watering tank more especially for use by small animals, for instance, hogs.

It is an object of the present invention to provide an improved watering tank that will be prevented from freezing in cold weather and that will be heated in a simple and inexpensive manner.

Another object of the present invention lies in providing an improved stock-watering tank of economical construction and consisting of few and simple parts, and which is adapted to exclude dirt and foreign matter from the drinking trough, at the same time allowing the animals free access thereto.

A further object of the present invention resides in providing an improved watering tank wherein quick and convenient access may be had to the water barrel or drum for filling the same, and in which improved means is provided for holding the water barrel or drum in the operative position where it may continuously deliver water to the drinking trough.

With these and further objects in view as will in part hereinafter become apparent and in part be stated, the invention comprises certain novel constructions, combinations and arrangements of parts as subsequently specified and claimed.

In the accompanying drawings,—

Figure 1 is a vertical central sectional view taken lengthwise through an improved watering tank constructed in accordance with the present invention.

Fig. 2 is a cross sectional view taken on the line 2—2 in Fig. 1.

Fig. 3 is a sectional view of the housing with the drum shown in elevation.

Fig. 4 is a fragmentary perspective view of one end wall of the housing showing the swinging door.

Fig. 5 is a plan view of the device with the lid lifted.

Fig. 6 is a longitudinal sectional view taken on the line 6—6 in Fig. 2.

Fig. 7 is a partial perspective view of the drum and one of its supports.

Fig. 8 is a fragmentary perspective view of one head of the drum with a portion of the fastening means, and Fig. 9 is a fragmentary perspective view of one wall of the housing showing a hook for coöperating with the fastening means in Fig. 8.

Referring more particularly to the drawings, 10 designates a housing composed of side and end walls, as shown, arranged in substantially box shape and having a lid 11 hinged, as indicated at 12, so that the same may be lifted in the manner shown in Figs. 3 and 5.

A watering trough 13 of suitable construction extends between the end walls of the housing, as indicated in Figs. 1, 2 and 3, and is adapted to contain water in a suitable quantity and to a suitable depth for the animals for which the trough is designed. Beneath the trough 13 is a compartment 14 for receiving one or more heating lamps 15, which are preferably placed directly beneath the trough 13. The lamps are placed through one of the side walls of the housing 10, which is provided with a door 16 for this purpose.

A pair of beams 17 extend across and between the sides of the housing 10 near the end walls of the latter, and are provided centrally with notches or depressions 18 for receiving the trunnions 19 of a water holding barrel or drum 20, which is supported for rotation on said trunnions within the housing. The notches or depressions 18 provide for centering the drum 20 in the housing and permit the same to be freely rotated on the trunnions.

In the drum is provided a filling neck 21, preferably centrally thereof, through which the water may be introduced, as, for instance, by a hose 22 shown in Fig. 3. Of course, the water may be poured in by employing a funnel in connection with the filling neck 21, or it may be introduced without the aid of a funnel.

One head of the drum 20, as indicated in Figs. 3, 5 and 8, is provided with angle irons or clips 23, having eyes 24 in which to receive the downwardly projecting bill 25 of a hook 26. This hook is more particularly shown in Fig. 9, and is made out of rod metal provided with an elongated shank 27 fitted for vertically sliding movement in a keeper 28 secured to one of the side walls of the housing 10.

Each end wall of the housing 10 is provided with a door 29 hung on hinges 30 provided at the upper edge of the door, so that the door may be freely opened by the heads of the animals, as indicated in Fig. 1, and will close by gravity after the animal withdraws. Frames 31 are provided on the interior of the end walls of the housing within the doors 29 and such frames extend below the level of the water in the trough 13, as clearly shown in Figs. 1 and 2, the edges of the frames being cut-away to correspond to the curvature of the upper longitudinal portions of the trough 13.

In use, the drum 20 is revolved on the trunnions 19 to bring the filling neck 21 to the upper portion of the housing 10, the cover 11 being, of course, raised for this purpose, as shown in Fig. 3. A hose 22 may then be connected to the filling neck 21 and a suitably quantity of water introduced into the drum. Water may also be simply poured in, if desired, as above explained.

One of the angle irons or fastening pieces 23 is adapted to be brought opposite the hook 26 when the filling neck 21 is in a suitable upper position in readiness for filling, and, as indicated in Fig. 3, the bill 25 of the hook is engaged through the eye 24 and acts to effectually lock the drum 20 against rotation while being filled.

After the drum has been filled with water, the hook 26 is removed from engagement with the fastening piece 23 and the drum is again rotated from the position indicated in Fig. 3 to that shown in Figs. 1 and 2, the filling neck 21 being brought to an inverted position with its mouth extending downwardly into the trough 13. The water will descend out of the drum through the filling neck and into the trough 13 by the action of gravity until the level of such water in the trough rises above and cuts off access of air to the filling neck, whereupon the partial vacuum produced in the drum 20 above the descending water will act to prevent the further flow. The water will preferably reach a level, such for instance as shown in Fig. 3, and will, of course, extend into the frames 31, so that an animal may push open either of the gravity-closed doors 29 and drink freely from the ends of the trough which extend into these door frames 31. The doors 29 will automatically swing back to closed position when the animal withdraws its head, and they, therefore, serve to exclude foreign matter from the drinking water in the trough 13, while also serving in some measure to prevent the escape of heat. The lamp or lamps 15 may be put in through the door 16 in cold weather and the same act to heat the water in the trough 13 and prevent the freezing thereof. The escape of the heat from the housing through the doors 29 is also effectually prevented by the frames 31 extending down beneath the liquid level, and, therefore, forming a seal against the passage of heat. The frames 31 form inclosures for the door openings which are cut off entirely from the remainder of the inside of the housing.

When sufficient water has been removed from the trough 13, additional water will descend from the drum 20 and replenish the same, and this action will go on until the water in the drum 20 is entirely exhausted. When the filling neck 21 is in the lower position, the other fastening 23 will be engaged with the hook 26, whereby to again hold the drum against rotation.

From the foregoing description it will be apparent that I have provided a simple and inexpensive construction, useful especially in cold weather for the watering of animals and which will keep the water in a sanitary condition.

I do not wish to be limited to size, form or proportions of the various parts, and it will be understood that various changes and modifications may be made without departing from the spirit of the invention, provided such changes fall within the scope of the appended claims.

What is claimed is:—

1. An improved stock watering tank comprising a housing adapted to be sunk partially at its lower end in the ground and having openings in its ends situated above the bottom of the housing, automatically closing doors for said openings adapted to be swung inwardly and upwardly by the animal in the act of drinking, a trough extending from end to end of the housing and situated above the bottom thereof yet beneath the lower edges of said openings, said trough having spaces along its sides to allow communication between the portions beneath and above the trough within the housing, hoods extending about said doors being disposed inwardly of the doors to permit swinging of the same, said hoods extending downwardly and partially into said trough and a barrel supported in the housing above said trough and having a filling and discharging neck adapted when in the inverted position to extend beneath the surface level of the liquid in the trough, a hook carried by the interior of the housing, a pair of coöperating eyes situated at angularly spaced distances on the barrel adapted to coöperate with said hook to hold the barrel with its filling and discharging neck in either an upright or an inverted position, an openable top for the housing adapted to give access for filling to the barrel, heating means placed beneath the trough in the lower portion of the housing, said heating means having access to the barrel and upper portion of the housing through the spaces at the sides of the trough, and a door in the lower portion of one side of the housing for giving access in placing and removing the heating means.

2. A stock watering tank comprising a housing having a flanged base adapted to be situated at a suitable depth in the ground and provided with end openings situated substantially at the ground level, doors hinged at their upper ends in the top portions of said openings and adapted to be swung inwardly by the animals, hoods arranged about said doors and disposed inwardly therefrom to provide spaces for the swinging of the doors, said hoods adapted to extend downwardly beneath the lower edges of the openings, a trough extending from end to end of said housing and being curved in transverse section, said trough adapted to hold a supply of water having cut off end bodies isolated by the portions of the housing projecting beneath the lower edges of the openings, supports extending cross-wise in the housing, a barrel having trunnions held on said supports, said barrel provided with a combined filling and discharging neck traveling in a path conforming to the curvature of the trough and adapted to extend close to the bottom of such trough when in the inverted position, a hook swingingly mounted in the upper portion of said housing, a pair of eyes secured to the barrel at angularly spaced apart distances and adapted to receive said hook whereby the barrel may be held in either the upright or inverted positions, a swinging top for the housing provided with openings in its ends, heating means placed in the base of the housing beneath said trough, and a door in the side of the housing at the lower portion thereof for giving access in placing and removing the heating means.

In testimony whereof, I have affixed my signature in presence of two witnesses.

ALBERT N. EATON.

Witnesses:
 ARTHUR H. STURGES,
 HIRAM A. STURGES.